Nov. 23, 1954
O. E. HILL
2,694,888
GRINDING MACHINE
Filed Dec. 30, 1953
3 Sheets-Sheet 1
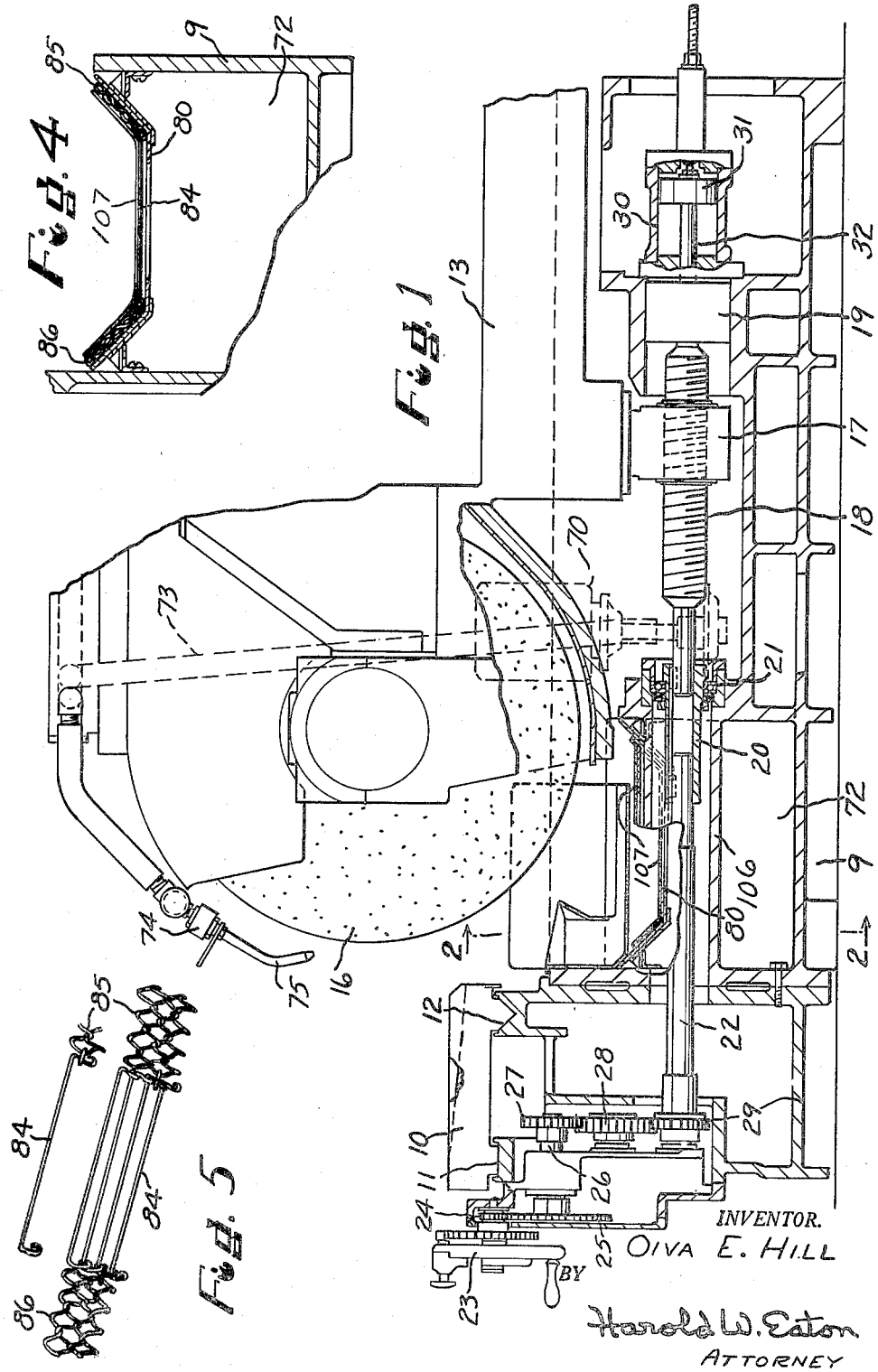
INVENTOR.
OIVA E. HILL
BY Harold W. Eaton
ATTORNEY

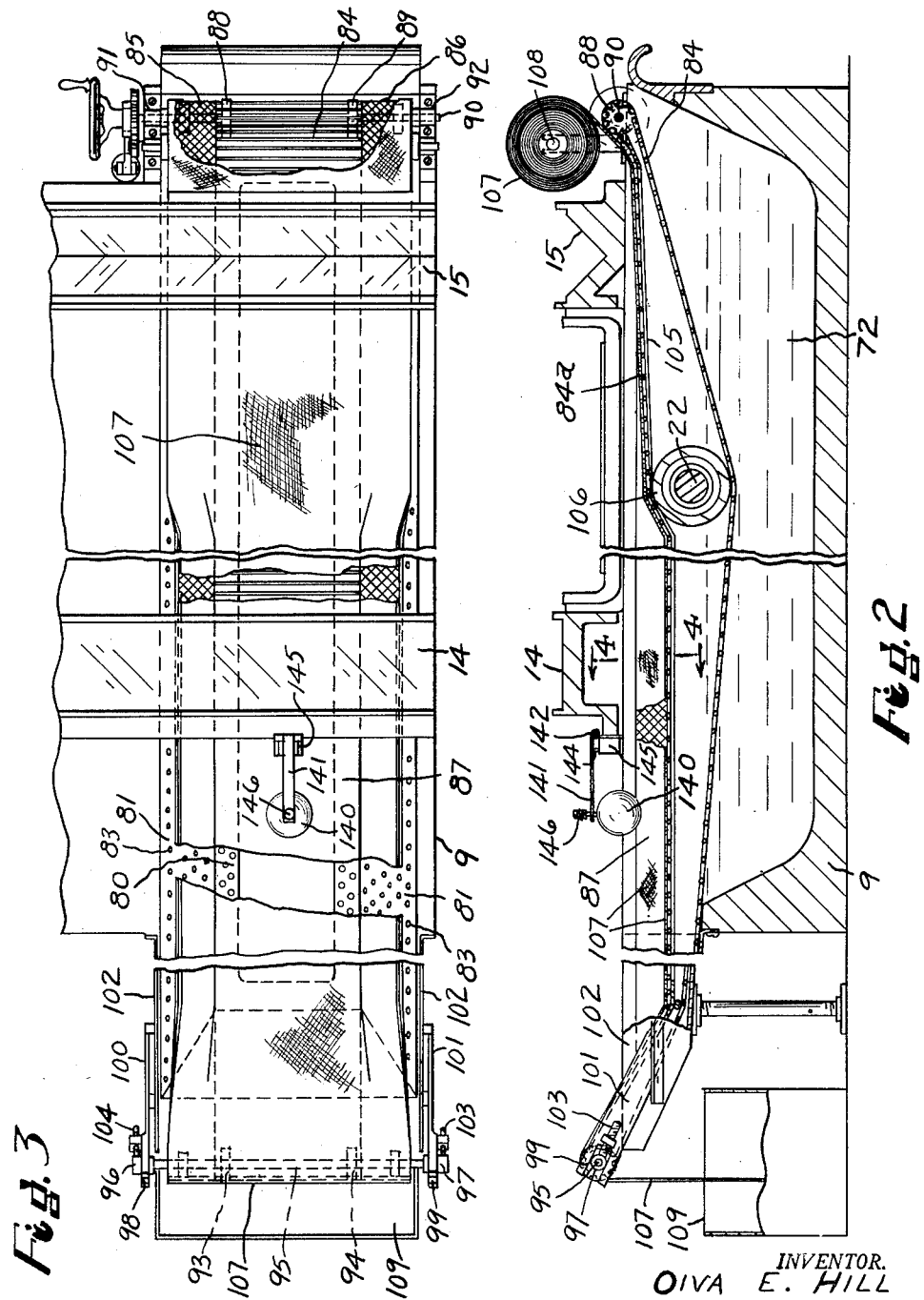

Nov. 23, 1954    O. E. HILL    2,694,888
GRINDING MACHINE
Filed Dec. 30, 1953    3 Sheets-Sheet 3

INVENTOR.
OIVA E. HILL
BY
Harold W. Eaton
ATTORNEY

United States Patent Office 2,694,888
Patented Nov. 23, 1954

2,694,888

GRINDING MACHINE

Oiva E. Hill, Worcester, Mass., assignor to Norton Company, Worcester, Mass., a corporation of Massachusetts Application December 30, 1953, Serial No. 401,300

6 Claims. (Cl. 51—267)

The invention relates to grinding machines, and more particularly to a coolant fluid system and an automatically operated filter apparatus therefor.

One object of the invention is to provide a simple and thoroughly practical grinding machine having an efficient automatically actuated coolant system. Another object is to provide an automatically controlled coolant fluid apparatus. Another object is to provide an automatically controlled filter apparatus for the coolant fluid. Another object is to provide a filter apparatus including a continuous strip of filter medium which is automatically indexed to provide a fresh filtering surface as required. Another object is to provide an automatically operated index mechanism for said filter medium. Another object is to provide a float actuated mechanism to operate said indexing mechanism when fluid reaches a predetermined level. A further object is to connect the float-actuated mechanism so that it operates to impart an automatic indexing of the filter medium only during a grinding cycle. Other objects will be in part obvious or in part pointed out hereinafter.

In the accompanying drawings in which is shown one of various possible embodiments of the mechanical features of the invention:

Fig. 1 is a fragmentary side elevation, partly in section, of the improved grinding machine;

Fig. 2 is a longitudinal vertical sectional view, taken approximately on the line 2—2 of Fig. 1, through the coolant filter apparatus;

Fig. 3 is a plan view of the apparatus as shown in Fig. 2;

Fig. 4 is a fragmentary cross sectional view, on an enlarged scale, taken approximately on the line 4—4 of Fig. 2, through the coolant filter apparatus;

Fig. 5 is a fragmentary detail view of the filter supporting conveyor; and

Figure 6:
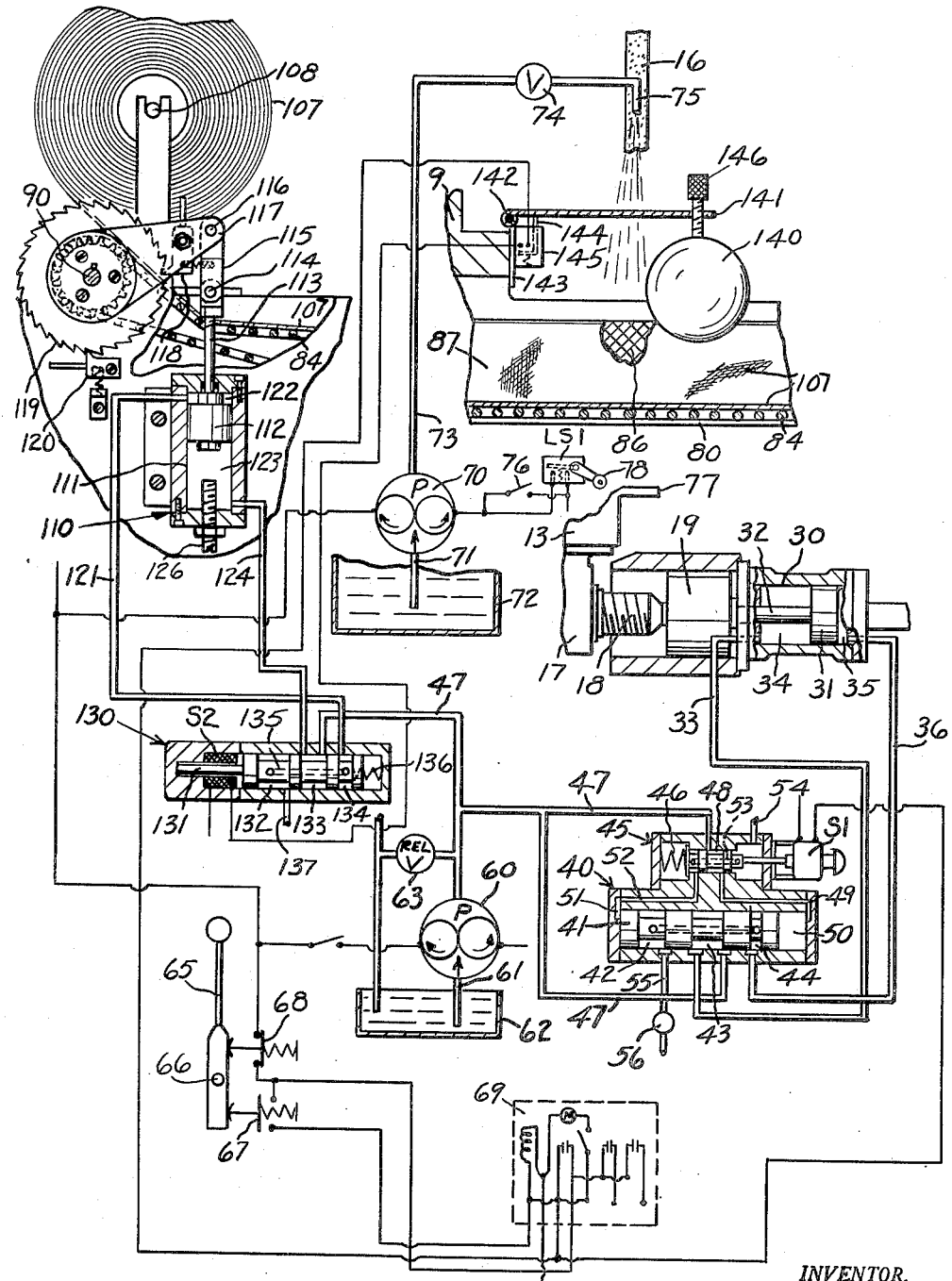
Fig. 6 is a combined hydraulic and electric diagram of the spraying mechanisms of the machine.

A grinding machine has been illustrated in the drawings comprising a base 9 which supports a longitudinally movable work table 10 on a flat way 11 and a V-way 12 formed on the upper surface of the base 9.

A transversely movable wheel slide 13 is slidably supported on a transversely arranged flat way 14 and a V-way 15 (Figs. 2 and 3) formed on the upper surface of the base 9. The wheel slide 13 serves as a support for a wheel spindle (not shown) which supports a rotatable grinding wheel 16.

A suitable feeding mechanism is provided for imparting a transverse feeding movement to the wheel slide 13 to feed the grinding wheel 16 toward and from the work piece being ground to grind the same to the desired predetermined extent. This feed mechanism may comprise a feed nut 17 depending from the underside of the wheel slide 13. The nut 17 meshes with or engages a rotatable feed screw 18. The right hand end of the feed screw 18 is rotatably journalled in a slidably mounted sleeve 19 supported within the base 9. The left hand end of the feed screw 18 is slidably keyed within a rotatable sleeve 20 which is journalled in an anti-friction bearing 21 supported by the base 9. A shaft 22 is slidably keyed within the other end of the sleeve 20.

A manually operable rotatable feed wheel 23 is mounted on the front of the machine base and is operatively connected to rotate a gear 24 which meshes with a gear 25 supported on a rotatable shaft 26. The shaft 26 supports a gear 27 which meshes with a gear 28. The gear 28 in turn meshes with a gear 29 fixedly mounted on the left hand end of the shaft 22. It will be readily apparent that a rotary motion of the feed wheel 23 will be imparted through the gear mechanism just described to rotate the feed screw 18 and thereby impart a transverse feeding movement to the wheel slide 13 and the grinding wheel 16. The direction of rotation of the feed wheel 23 serves to determine the direction of movement of the wheel slide 13.

In order to rapidly position the grinding wheel 16 relative to the work piece being ground, a hydraulically operated mechanism is provided comprising a cylinder 30 supported within the base 9 in axial alignment with the slidably mounted sleeve 19. The cylinder 30 contains a slidably mounted piston 31 which is fixedly connected to one end of a piston rod 32. The other end of the piston rod 32 is fixedly connected to the sleeve 19 so that a longitudinal movement of the piston 31 will be imparted to cause an axial movement of the feed screw 18 to rapidly move the wheel slide 13 to and from a grinding position. When fluid under pressure is passed through a pipe 33 into a cylinder chamber 34, the piston 31 will be moved toward the right thereby moving the wheel slide 13 and the grinding wheel 16 rapidly to a rearward or inoperative position. During this movement of the piston 31 fluid within a cylinder chamber 35 may exhaust through a pipe 36.

A suitable control valve 40 is provided for controlling the admission to and exhaust of fluid from the cylinder 30. The control valve 40 is preferably a piston-type valve comprising a slidable valve member 41 having a plurality of spaced valve pistons formed integrally therewith to form a plurality of spaced valve chambers 42, 43, and 44. A pilot valve 45 is provided for controlling the movement of the slidably mounted valve member 41. The pilot valve 45 is normally held in a right hand end position by a spring 46. Fluid under pressure passing through a pipe 47 enters a valve chamber 48 and passes through a passage 49 into an end chamber 50 to move the valve member 41 toward the left into an extreme left hand end position. During this movement of the valve member 41, fluid within an end chamber 51 may exhaust through a passage 52, through a central passage 53 formed in the pilot valve 45 and passes outwardly through an exhaust pipe 54.

A solenoid S1 is provided for shifting the pilot valve toward the left when it is desired to cause an approaching movement of the wheel slide 13, that is, toward the left (Fig. 1). When the solenoid S1 is energized and the valve 45 is shifted into a left hand end position, fluid under pressure passing through the pipe 47 into the valve chamber 48 passes through the passage 52 into the end chamber 51 to shift the slidably mounted valve member 41 toward the right thereby reversing the flow of fluid to the cylinder 30. When the valve member 41 is in its right hand end position fluid under pressure passing through the pipe 47 enters the valve chamber 43 and passes out through the pipe 36 into the cylinder chamber 35 to cause the piston 31 together with the feed screw 18, the wheel slide 13 and the grinding wheel 16 to move rapidly toward the work piece to be ground. During this movement fluid may exhaust from the cylinder chamber 34 through the pipe 33 into the valve chamber 42 and out through an exhaust pipe 55. A throttle valve 56 is provided within the exhaust pipe 55 to facilitate controlling the rate of exhaust of fluid from the cylinder chamber 34 and thereby to control the rapid approaching and receding movement of the wheel slide 13.

A fluid pressure system is provided for supplying fluid under pressure comprising a motor driven pump 60 which draws fluid through a pipe 61 from a reservoir 62 and passes fluid under pressure through the pipe 47 to the various mechanisms of the machine. A relief valve 63 is provided in the pipe line 47 to facilitate passing excess fluid under pressure from the pipe 47 directly into the reservoir 62.

A manually operable control lever 65 is pivotally supported by a stud 66 on the front of the machine base. The control lever 65 is arranged when rocked to actuate a start switch 67 or a stop switch 68. When the start switch 67 is closed by a counter-clockwise movement of the control lever 65, a circuit is closed to energize an electric timer 69 which serves to energize the solenoid S1 to start a rapid approaching movement of the grinding wheel 16. A holding circuit is provided to maintain the timer 69 energized even though the start switch 67 is a momentary contact switch. After a predetermined time interval has elapsed, the timer opens a circuit to deenergize the solenoid S1 thereby reversing the flow of fluid under pressure to the cylinder 30 to cause a rapid rearward movement of the wheel slide 13 to an inoperative position.

A coolant supply system is provided for conveying coolant fluid to the periphery of the grinding wheel and the work piece at the point of contact therebetween. This system may comprise a motor driven coolant pump 70 which draws coolant fluid through a pipe 71 from a coolant reservoir 72 and forces the coolant fluid through a pipe 73, through a control valve 74 and through an adjustably mounted nozzle 75 onto the grinding wheel periphery and the work piece (not shown). A manually operable switch 76 is provided for starting and stopping the coolant pump 70. If desired, the motor driven coolant pump 70 may be started and stopped automatically by and in timed relation with the wheel slide 13. A cam 77 on the wheel slide 13 (Fig. 6) moves in the path of an actuating roller 78 of a normally open limit switch LS1 automatically to start the flow of coolant fluid as the wheel slide 13 moves toward the work table 10.

In a wet grinding operation where coolant fluid is employed, the coolant fluid is recirculated and in order to obtain a high section upon the work piece being ground, it is necessary to settle-out or filter swarf from the coolant fluid before it is recirculated. As shown in the drawings, the coolant reservoir 72 is formed within the base 9 and extends longitudinally over the base parallel to the path of movement of the table 10.

A suitable filtering apparatus is provided whereby a fresh filtering medium may be periodically and automatically provided to provide an efficient filtering of the returning coolant fluid. As shown in the drawings a rectangularly shaped, sheet metal pan 80 is provided for enclosing a portion of the open upper side of the reservoir 72. The central part of the pan 80 is formed as a horizontal plane surface having upwardly flaring sides 81 formed adjacent thereto to form a suitable support for the filtering medium to be hereinafter described. The bottom plane surface of the pan 80 is provided with a longitudinally extending rectangularly shaped aperture which opens into the reservoir 72. The flared side faces 81 of the pan 80 are provided with peripheries 83 which also allows coolant fluid to pass therethrough into the reservoir 72.

The filtering medium consists of an endless type conveyor support comprising an endless supporting chain consisting of a plurality of spaced parallel rods 84 which are of a length substantially equal to the width of the bottom portion of the pan 80. The endless conveyor is provided with side portions consisting of a pair of wire mesh bands 85 and 86 which are fastened to the rods 84. The wire mesh sides 85 and 86 are sufficiently flexible so that they will follow the flared side faces 81 of the pan 80 to form a pan shaped surface 87. The conveyor above described serves as an endless chain for supporting a sheet of flexible filtering paper or cloth. The conveyor chain 84 is supported at the right hand end by a pair of spaced sprockets 88 and 89. The sprockets 88 and 89 are fixedly mounted on a shaft 90 which is journalled in bearings 91 and 92 which are fixedly mounted relative to the base 10. The upper run of the conveyor chain 84 extends in a generally horizontal direction lengthwise of the machine and at its other end wraps around a pair of spaced sprockets 93 and 94 which are mounted on a rotatable shaft 95 journalled in suitable bearing sleeves 96 and 97 respectively.

The bearing sleeves 96 and 97 are preferably adjustably supported so that the position of the shaft 95 and the sprockets 93 and 94 may be varied relative to the base 9 to facilitate taking-up the slack in the conveyor chain 84. As illustrated, the bearing sleeves 96 and 97 are slidably supported in a pair of slots 98 and 99 respectively formed in the brackets 100 and 101 respectively. The brackets 100 and 101 are fixedly mounted on a casing 102 which is fastened to the base 9. A pair of adjusting screws 103 and 104 supported by the brackets 100 and 101 respectively are provided for adjusting the position of the bearing sleeves 96 and 97 within the slots 98 and 99 relative to the brackets 100 and 101 respectively.

A portion 84a of the chain 84 slides on a slightly sloping surface 105 of the bottom surface of the pan 80. After passing over a housing 106 surrounding the feed screw 18, the bottom surface of the pan 80 drops to a lower level to form a depressed section where returning coolant from the grinding operation may be confined and filtered.

A continuous roll of filtering medium 107, such as filter cloth or paper, is supported by a shaft 108. The filter cloth or paper then passes onto and extends along the top surface of the chain 84 and is supported thereby, and extends over the left hand end of the chain 84 (Figs. 2 and 3). After passing over the left hand end of the chain 84, the sheet of filter material 107 together with the accumulation of swarf thereon drops into a refuse container 109.

Due to the weight of the coolant and swarf draining from the grinding wheel and work support and associated parts through an inlet passage 125 into the pan-shaped depression 87 formed by the link chain 84 and the layer of filter medium supported thereby, the filter medium is caused to advance as the chain 84 is indexed.

A suitable power operated mechanism is provided for intermittently and incrementally advancing the link chain 84 and the filter medium 107 comprising a motor 110 which as illustrated comprises a fluid cylinder 111 containing a slidably mounted piston 112. The piston 112 is connected to the lower end of a piston rod 113. The upper end of the piston rod 113 is connected by a stud 114 with the lower end of a link 115. The upper end of the link 115 is connected by a stud 116 with a pawl carrying arm 117. The pawl carrying arm 117 is rotatably supported by the shaft 90. The pawl carrying arm 117 is provided with a pivotally mounted spring actuated index pawl 118 which is arranged to engage the teeth of a ratchet wheel 119 fixedly mounted on the shaft 90. A safety pawl 120 is provided to prevent counter-clockwise motion of the ratchet wheel during the idle stroke of the index pawl 118.

When fluid under pressure is passed through a pipe 121 into a cylinder chamber 122, the piston 112 is moved downwardly thereby rocking the pawl carrying arm 117 in a clockwise direction (Fig. 6) to advance the link chain 84 together with the filter medium 107 toward the right (Fig. 6) and toward the left (Fig. 2). During the downward movement of the piston 112, fluid within a cylinder chamber 123 may exhaust through a pipe 124.

A suitable control valve 130 is provided for controlling the admission to and exhaust of fluid from the cylinder 111. The valve 130 is preferably a piston-type valve comprising a slidably mounted valve member 131 having a plurality of spaced valve pistons formed integrally therewith to form a plurality of valve chambers 132, 133 and 134. The slidably mounted valve member 131 is also provided with a central passage 135 which interconnects the valve chamber 132 with the valve chamber 134. A spring 136 normally serves to hold the valve member 131 in a left hand end position. A solenoid S2 is provided which when energized serves to shift the valve member 131 toward the right so as to reverse the flow of fluid under pressure to the cylinder 111.

It is desirable to provide means for adjusting the stroke of the piston 112 to facilitate adjusting the extent of advance of the filter medium at each incremental feeding movement thereof. This adjustment may be accomplished by means of an adjusting screw 126 to vary the stroke of the piston 112 and the index pawl 118.

As shown in Fig. 6 fluid under pressure from the pressure pipe 47 enters the valve chamber 133 and passes through the pipe 124 into the cylinder chamber 123 to move the valve piston 112 in an upward direction during which movement the index pawl 118 rides idly over the teeth of the ratchet wheel 119. During this movement fluid with the cylinder chamber 122 may exhaust through the pipe 121 into the valve chamber 134 of the control valve 130, through the central passage 135 into the valve chamber 132 and pass outwardly through an exhaust pipe 137.

When the solenoid S2 is energized and the valve member 131 is shifted into a right hand end position fluid under pressure entering the valve chamber 133 may pass through the pipe 121 into the cylinder chamber 122 to cause a downward movement of the piston 112 so as to rock the pawl carrying arm 117 in a clockwise direction during which movement the index pawl 118 imparts a rotary motion to the ratchet wheel 119 thereby imparting an indexing movement to the link chain 84 and the filter medium 107.

Coolant from the grinding operation drains into a depressed portion 87 onto the filter paper 107, the coolant fluid filters through the paper into the coolant reservoir 72 and filters out the swarf which remains on the surface of the filter paper 101. When the depressed portion of the filter paper 101 in the pan-shaped depression 87 becomes loaded with swarf, the coolant cannot readily filter through and drain into the reservoir 72. The coolant level together with the swarf raises within the depressed area 87 and at this time it is desirable to automatically advance the conveyor chain so as to provide a fresh portion of the filter paper 107 at the right hand end of the depressed area 87.

In order to automatically advance the filter paper 107 when the depressed area 87 becomes loaded and the level of the swarf and coolant raises, a float-actuated mechanism is provided for automatically imparting a feeding movement to the conveyor chain 84. As illustrated in the drawings a float 140 is supported adjacent to the end of an arm 141 which is pivotally connected by a stud 142 is carried by a bracket 143 which is fixedly mounted on a portion of the base 9. The arm 141 is arranged to move in the path of an actuating plunger 144 of a normally closed limit switch 145. An adjusting screw 146 is provided to facilitate adjusting the position of the float 140 relative to the arm 141. The limit switch 145 is operatively connected to close a circuit, to make the circuit ready for energization of the solenoid S2.

It is desirable to provide operative connections so that if during a grinding operation the accumulation of swarf on the filter paper 107 requires a feeding movement thereof, it will take place automatically during the grinding operation. One side of the circuit of the limit switch 145 is connected to the timer 69. When the timer 69 is energized during a grinding cycle and the level of swarf and coolant in the depressed area 87 rises to a sufficient extent, the float 140 is moved upwardly to swing the arm 141 in a counter-clockwise direction. After the arm 141 has swung through a sufficient distance, the limit switch 145 closes thereby completing the circuit to energize the solenoid S2 to shift the slidably mounted valve member 131 toward the right thereby passing fluid under pressure through the pipe 121 into the cylinder chamber 122 to cause a downward movement of the piston 112. The downward movement of the piston 112 serves through the pawl 118 to impart a rotary motion to the ratchet wheel 119 thereby advancing the link chain 84 together with the filter paper 107 to present a fresh portion of filter paper adjacent to the right hand end of the depressed area 87. After this indexing movement has been completed, excess coolant fluid within the depressed area 87 may filter through the fresh portion of the filter paper 107 into the reservoir 72. As soon as the level of the coolant within the depressed area 87 has dropped sufficiently so that downward movement of the float 140 allows the arm 141 to swing in a clockwise direction, the limit switch 145 is opened thereby deenergizing the solenoid S2 which reverses the flow of fluid under pressure to the cylinder 111 to cause an upward movement of the piston 112 thereby moving the ratchet pawl 118 idly over the teeth of the ratchet wheel 119. If during the grinding operation the float again rises due to an accumulation of swarf, the limit switch 145 may again be closed automatically to impart a further indexing movement to the link chain 84 and the filter paper 101.

As the link chain 84 together with the filter paper 107 is incrementally indexed or advanced, the accumulation of swarf on the filter paper 107 together with the used portion of the filter paper 107 drops into the refuse container 109 located adjacent to the left hand end of the coolant reservoir as shown in Fig. 2.

The operation of the improved filtering arrangement will be readily apparent from the foregoing disclosure. During a feeding movement of the grinding wheel, if fresh filtering medium is required, this is automatically obtained in a manner above described periodically to present fresh filtering paper. The swarf loaded filter medium 107, if paper, may be discarded from the container 109. If a cloth filter medium is utilized, it may be cleaned and reused if desired.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a transversely movable rotatable grinding wheel thereon, means to feed said grinding wheel transversely in either direction, a coolant fluid system including a coolant reservoir, means including a pump to convey coolant fluid from said reservoir to the grinding wheel, and a filter apparatus to filter swarf from said fluid before it returns to said reservoir comprising a continuous strip of filter medium to receive said fluid from the grinding wheel, a pan-shaped support therefor, power operated mechanism intermittently to index said filter medium, a float-actuated means to control said mechanism and operative connections between said float-actuated means and the grinding wheel feeding mechanism to actuate said power operated mechanism only during a feeding movement of the wheel slide.

2. In a grinding machine having a base, a transversely movable wheel slide thereon, a rotatable grinding wheel on said slide, an electrically controlled feeding mechanism for said grinding wheel to feed the wheel transversely in either direction, means including an electric timer to control the duration of the feeding cycle, a coolant fluid system including a coolant reservoir in the base, means including a motor driven pump to convey coolant fluid from said reservoir to the grinding wheel, and a filter apparatus to filter swarf from fluid draining from the grinding wheel including a continuous strip of filter medium, a pan-shaped support therefor located above said coolant reservoir, a power operated mechanism intermittently to index said filter medium, a float-actuated means to control said mechanism, and operative connections between said float-actuated means and said timer to actuate said power operated mechanism only during a feeding movement of the wheel slide.

3. In a grinding machine having a base, a transversely movable wheel slide thereon, a rotatable grinding wheel on said slide, an electrically controlled fetding mechanism for said grinding wheel to feed the wheel transversely in either direction, means including an electric timer to control the duration of the feeding cycle, a coolant fluid system including a coolant reservoir within the base, means including a motor driven pump to convey coolant fluid from said reservoir to the grinding wheel, means including a limit switch actuated by and in timed relation with said wheel slide to start said coolant pump, and a filter apparatus to filter swarf from fluid draining from said grinding wheel including a conveyor chain extending across the coolant tank, a continuous strip of filter medium supported thereby, a pan-shaped support for said conveyor to form a pan-shaped depression in the filter medium within which draining fluid may be confined, a power operated mechanism intermittently to index said conveyor and the filter medium supported thereby, a float-actuated switch to control said mechanism, and operative connections between said float-actuated means and said timer to actuate said power operated mechanism automatically during a feeding movement of the grinding wheel when the fluid within said pan rises to a predetermined level.

4. In a grinding machine as claimed in claim 2, in combination with the parts and features specified in which the power operated mechanism includes a pawl and ratchet feed mechanism for the filter medium, a piston and cylinder operatively connected to actuate said pawl and ratchet mechanism, a solenoid-actuated control valve for controlling the flow of fluid to and from said cylinder, and a limit switch actuated by said float when the fluid in said pan-shaped support rises to a predetermined level to energize said valve to impart an indexing movement to said filter medium.

5. In a grinding machine as claimed in claim 2 in combination with the parts and features therein specified in which the power operated mechanism includes a pawl and ratchet feeding mechanism for said filter medium, a piston and cylinder operatively connected to actuate said pawl and ratchet mechanism, a solenoid valve for controlling the flow of fluid under pressure to and from said cylinder, a limit switch actuated by said float when fluid in said pan-shaped support rises to a predetermined level to energize said valve to impart an indexing movement to said filter medium, and means to adjust the stroke of said piston to vary the advance of said filter medium at each indexing movement thereof.

6. In a grinding machine as claimed in claim 2, in combination with the parts and features therein specified in which a hydraulically operated pawl and ratchet mechanism is provided for indexing said filter medium, a solenoid-actuated control valve for controlling the admission to and exhaust of fluid from said mechanism, a limit switch actuated by movement of said float which is connected in series with said timer to energize said control valve when the fluid on said filter rises to a predetermined level, said valve being energized only during a grinding wheel feeding cycle.

References Cited in the file of this patent

UNITED STATES PATENTS

| Number | Name | Date |
|---|---|---|
| 1,734,002 | Belden | Oct. 29, 1929 |
| 1,938,875 | Stratton | Dec. 12, 1933 |
| 2,567,589 | Alvord | Sept. 11, 1951 |
| 2,664,203 | Crane et al. | Dec. 29, 1953 |
| 2,665,812 | Crane | Jan. 12, 1954 |